(12) United States Patent
Ford

(10) Patent No.: US 11,696,655 B2
(45) Date of Patent: Jul. 11, 2023

(54) SYSTEMS, METHODS AND APPARATUS FOR PLANTER FRAME

(71) Applicant: Dan Ford, Allen, TX (US)

(72) Inventor: Dan Ford, Allen, TX (US)

(*) Notice: Subject to any disclaimer, the term of this patent is extended or adjusted under 35 U.S.C. 154(b) by 77 days.

(21) Appl. No.: 16/900,889

(22) Filed: Jun. 13, 2020

(65) Prior Publication Data
US 2021/0386220 A1 Dec. 16, 2021

(51) Int. Cl.
A47G 7/04 (2006.01)
A01G 9/02 (2018.01)

(52) U.S. Cl.
CPC ............. *A47G 7/045* (2013.01); *A01G 9/024* (2013.01)

(58) Field of Classification Search
CPC .......... A01G 9/022; A01G 9/02; A01G 9/024; A01G 9/026; A47G 7/045; A47G 7/042
See application file for complete search history.

(56) References Cited

U.S. PATENT DOCUMENTS

| | | | | | |
|---|---|---|---|---|---|
| 112,433 | A | * | 3/1871 | Eastman | A01G 9/02 47/65.5 |
| 936,619 | A | * | 10/1909 | Foy | A01G 9/022 47/39 |
| 1,190,147 | A | * | 7/1916 | Gloede | A01G 9/022 47/39 |
| 1,826,547 | A | * | 10/1931 | Jackson | A01G 9/02 47/63 |
| 2,573,770 | A | * | 11/1951 | Meadow | A45C 3/06 150/107 |
| 2,812,098 | A | * | 11/1957 | Escaut | A47J 43/24 220/489 |
| 2,945,323 | A | * | 7/1960 | Pratt | A01G 9/0291 47/77 |
| 5,967,360 | A | * | 10/1999 | Cheng-Tien | A47G 7/047 220/489 |
| 2003/0024160 | A1 | * | 2/2003 | Hendrickson | A01G 9/024 47/67 |
| 2006/0005466 | A1 | * | 1/2006 | Atchley | A01G 9/024 47/39 |
| 2006/0112633 | A1 | * | 6/2006 | Humphrey | A47G 7/041 47/66.6 |
| 2009/0158653 | A1 | * | 6/2009 | Oliver | A01G 27/04 47/66.2 |
| 2009/0206046 | A1 | * | 8/2009 | Lunato | A01G 9/02 211/85.18 |
| 2015/0238028 | A1 | * | 8/2015 | Moskowitz | A47G 7/02 248/27.8 |
| 2018/0110189 | A1 | * | 4/2018 | Smith | A01G 9/024 |

* cited by examiner

*Primary Examiner* — Monica L Perry
*Assistant Examiner* — Aaron M Rodziwicz
(74) *Attorney, Agent, or Firm* — Nolan IP Law; Jason M. Nolan

(57) ABSTRACT

A frame including at least two hangers and at least two vertical members, each of the vertical members attached to at least one of the hangers on a first side of the vertical members, and a bottom attached to a second side of the each of the vertical members.

17 Claims, 16 Drawing Sheets

SYSTEMS, METHODS AND APPARATUS FOR PLANTER FRAME

FIELD

This disclosure relates generally to planters, and more particularly to flowerpots (Jardinières), containers, cachepots, window boxes (a planter attached to a windowsill), sub-irrigated planters, tubs, urns, patio planters, plant pots, pots and flower planters.

BACKGROUND

Conventional planters typically have a much larger volume of dirt than is required to properly cultivate the plant(s) in the planter. The interior volume of the planters is typically much larger than the amount of dirt that is required to cultivate the plant. However, the conventional way to cultivate a plant in a conventional planter is to fill the interior of the planter with dirt, and then plant the plant in the top portion of the dirt at the top of planter. A considerable amount of the dirt below the plant is never utilized by the plant. The additional amount of the dirt below the plant adds expense and needless deadweight to the planter. The deadweight can often make moving the planter quite a lot more difficult, if not impossible to move, by a single individual human. The deposit of the plant in the top of the dirt in the planter also requires that to move the plant, the plant must be dug-out of the planter, thus the plant can be difficult to move, or downright immobile.

BRIEF DESCRIPTION

The above-mentioned shortcomings, disadvantages and problems are addressed herein, which will be understood by reading and studying the following specification.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into four sections. In the first section, apparatus of implementations are described. In the second section, implementations of methods are described. In the third section, a hardware and operating environment of robotic control of assembly is described. Finally, a conclusion of the detailed description is provided in the fourth section.

Apparatus Implementations

Figure 1:
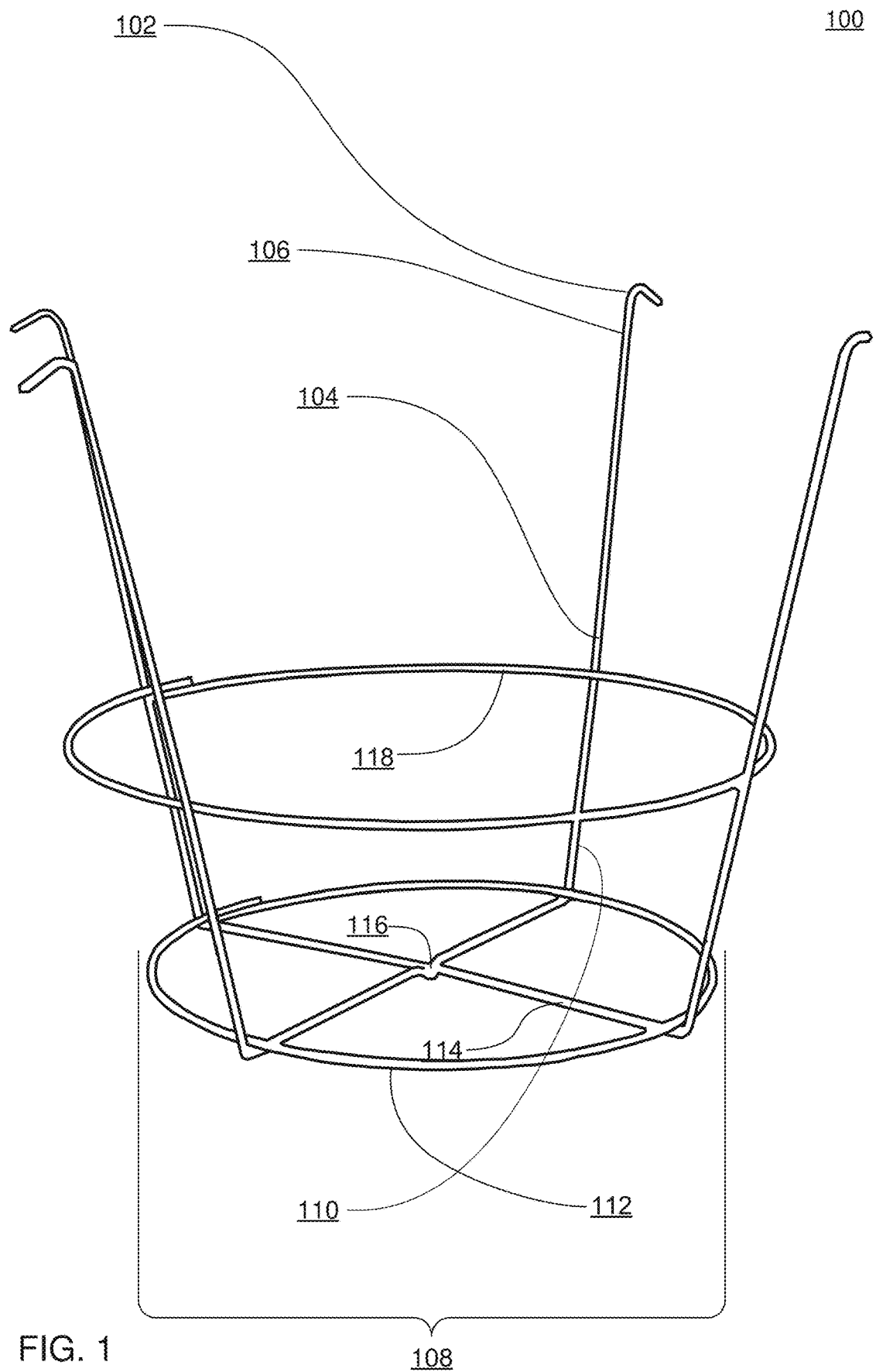
FIG. 1 is an isometric diagram of an overview of an planter apparatus, according to an implementation.

FIG. 1 is an isometric diagram of an overview of an planter apparatus 100. Planter apparatus 100 provides a means of containing and holding a smaller planter in a larger planter, and a means of transporting the smaller planter to a second larger planter.

Planter apparatus 100 is a frame to hold a first planter in a second planter in which the frame includes at least two hangers 102 and at least two vertical members 104, each of the vertical members 104 attached to at least one of the hangers 102 on a first side 106 of the vertical members 104, and a bottom 108 is attached to a second side 110 of the each of the vertical members 104.

In some implementations of planter apparatus 100, each of the hangers 102 further comprise a hook that is curved away and downward from the first side 106 of the vertical members 104 (as shown in FIG. 1).

In some implementations of planter apparatus 100, each of the hooks circumscribe a mouth of the second planter (not shown in FIG. 1)

In some implementations of the planter apparatus 100, the bottom 108 further comprises a first ring 112 (bottom ring) along a horizontal plane and the bottom 108. The first ring 112 shown in FIG. 4-8 is an outer compression ring. Some implementations of the planter apparatus 100 further comprise additional structure in the horizontal plane, wherein the additional structure further comprises at least one cross-member 114 (as shown in FIG. 1).

In some implementations of the planter apparatus 100, the at least one cross-member 114 further comprises two equilateral cross-members that intersect each other in a center 116 of the bottom 108 (as shown in FIG. 1).

In some implementations of the planter apparatus 100, the at least two hangers 102 further comprise four hangers 102 (as shown in FIG. 1) and the at least two vertical members 104 further comprises four vertical members 104 (as shown in FIG. 1).

In some implementations of the planter apparatus 100, each of the hangers 102 is integral (formed from one piece of material) with one of the vertical members 104 (as shown in FIG. 1). For round planters, the planter apparatus 100 includes at least three vertical members 104 because having only two vertical members 104 is more susceptible to swaying from side-to-side from sideways bumps or jolts.

In some implementations of the planter apparatus 100, the frame further comprises at least one middle ring 118 that further comprises second ring along the horizontal plane and each middle ring is attached to each of the vertical members 104, which can be used to expand the radius and diameter of the hook pattern, or can be used to compress to fit smaller openings.

In some implementations of the planter apparatus 100, the hangers 102, the vertical members 104, the bottom 108 and the middle ring 118 are metal wire (as shown in FIG. 1) or plastic or any functionally equivalent weight-bearing material. In other implementations of the planter apparatus 100, the hangers 102, the vertical members 104, the bottom 108 and the middle ring 118 are plastic.

In some implementations of the planter apparatus 100, an interior geometric size and an interior shape of the frame is larger than an exterior geometric size and an exterior shape of the first planter.

In some implementations of the planter apparatus 100, the interior geometric size and the interior shape of the frame is approximately the exterior geometric size and the exterior shape of the first planter.

In some implementations, such as shown in FIG. 1, distal vertical members 104 and cross-members of the bottom 108 are formed from singular pieces of material, such as metal wire (as shown in FIG. 1). In the example of FIG. 1, two distal vertical members 104 and one cross-member of the bottom 108 are formed from a singular piece of material, such as metal wire and another two distal vertical members 104 and one cross-member of the bottom 108 are formed from another singular piece of material, such as metal wire (as shown in FIG. 1).

Planter apparatus 100 provides a means of containing and holding a smaller planter in a larger planter, and provides a means of transporting the smaller planter to a second larger planter because the smaller planter can be removed by lifting the planter apparatus 100 by the hangers 102, thereby lifting the smaller planter in the planter apparatus 100 from the larger planter, and thereafter the planter apparatus 100 and the smaller planter in the apparatus can be easily transported to another larger planter without having to dig out the plant from the larger planter.

While the planter apparatus 100 is not limited to any particular hangers 102, vertical members 104, first side 106, a bottom 108, second side 110 of the each of the vertical members 104, first ring 112, one cross-member 114, center 116 of the bottom 108 and middle ring 118, for sake of clarity simplified hangers 102, vertical members 104, first side 106, a bottom 108, second side 110 of the each of the vertical members 104, first ring 112, one cross-member 114, center 116 of the bottom 108 and middle ring 118 are described.

Figure 2:
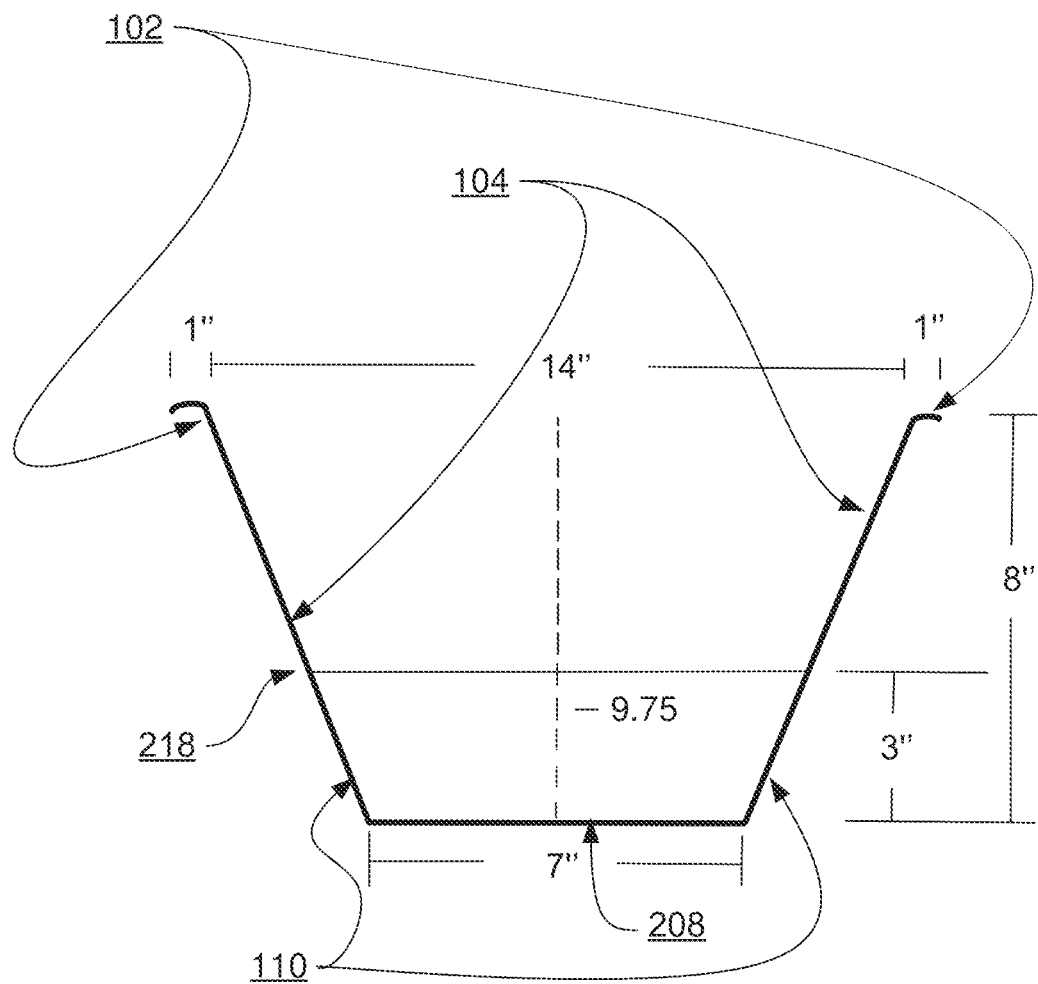
FIG. 2 is a block diagram of a planter apparatus according to an implementation for holding a 1 gallon planter.

FIG. 2 is a block diagram of a planter apparatus 200 for holding a 1 gallon planter. Planter apparatus 200 provides a means of containing and holding a smaller planter (1 gallon volume having dimension of 7" tall and 6.25" top diameter) in a larger planter, and that provides a means of transporting the smaller planter to the second larger planter. The smaller planter and the larger planter are not shown in FIG. 2.

Planter apparatus 200 is a frame that includes at least two hangers 202 and at least two vertical members 204. Each of the hangers 202 is integral (formed from one piece of material) with one of the vertical members 204 (as shown in FIG. 2). In some implementations of the planter apparatus 200, each of the hangers 202 further comprise a hook that is curved away and downward from the first side 206 of the vertical members 204 (as shown in FIG. 2). In some implementations of the planter apparatus 200, each of the hooks circumscribe a mouth of the second planter (not shown in FIG. 2).

A bottom 208 is attached to a second side 210 of the each of the vertical members 204. The bottom 208 further comprises a first ring 212 (not shown in FIG. 2) along a horizontal plane and the bottom 208 further comprises additional structure in the horizontal plane, where in the additional structure further comprises at least one cross-member 214 (not shown in FIG. 2). The at least one cross-member 214 further comprises two equilateral cross-members that intersect each other in a center 216 of the bottom 208 (not shown in FIG. 2).

In some implementations of the planter apparatus 200, the at least two hangers 202 further comprise four hangers 202 (not shown in FIG. 2) and the at least two vertical members 204 further comprises four vertical members 204 (as shown in FIG. 2).

In some implementations of the planter apparatus 200, the frame further comprises at least one middle ring 218 that further comprises a second ring (not shown in FIG. 2) along the horizontal plane; and each middle ring 218 is attached to each of the vertical members 204, which can be used to expand the radius and diameter of the hook pattern, or can be used to compress to fit smaller openings.

In some implementations of the planter apparatus 200, the hangers 202, the vertical members 204, the bottom 208 and the middle ring 218 are metal wire (as shown in FIG. 2) or plastic; or compressed to fit smaller openings.

In some implementations of the planter apparatus 200, an interior geometric size and an interior shape of the frame is larger than an exterior geometric size and an exterior shape of the smaller planter.

In some implementations of the planter apparatus 200, the interior geometric size and the interior shape of the frame is approximately the exterior geometric size and the exterior shape of the smaller planter.

In some implementations, (not shown in FIG. 2), distal vertical members 204 and cross-members of the bottom 208 are formed from singular pieces of material, such as metal wire or plastic. Two distal vertical members 204 and one cross-member of the bottom 208 are formed from a singular piece of material, such as metal wire or plastic and another two distal vertical members 204 and one cross-member of the bottom 208 are formed from another singular piece of material (not shown in FIG. 2), such as metal wire or plastic.

Planter apparatus 200 provides a means of containing and holding a smaller planter (1 gallon volume having dimension of 7" tall and 6.25" top diameter) in a larger planter, and a means of transporting the smaller planter to a second larger planter because the smaller planter can be removed by lifting the planter apparatus 200 by the hangers 202, thereby lifting the smaller planter in the planter apparatus 200 from the larger planter, and thereafter the planter apparatus 200 and the smaller planter in the apparatus can be easily transported to another larger planter without having to dig out the plant from the larger planter.

Figure 3:
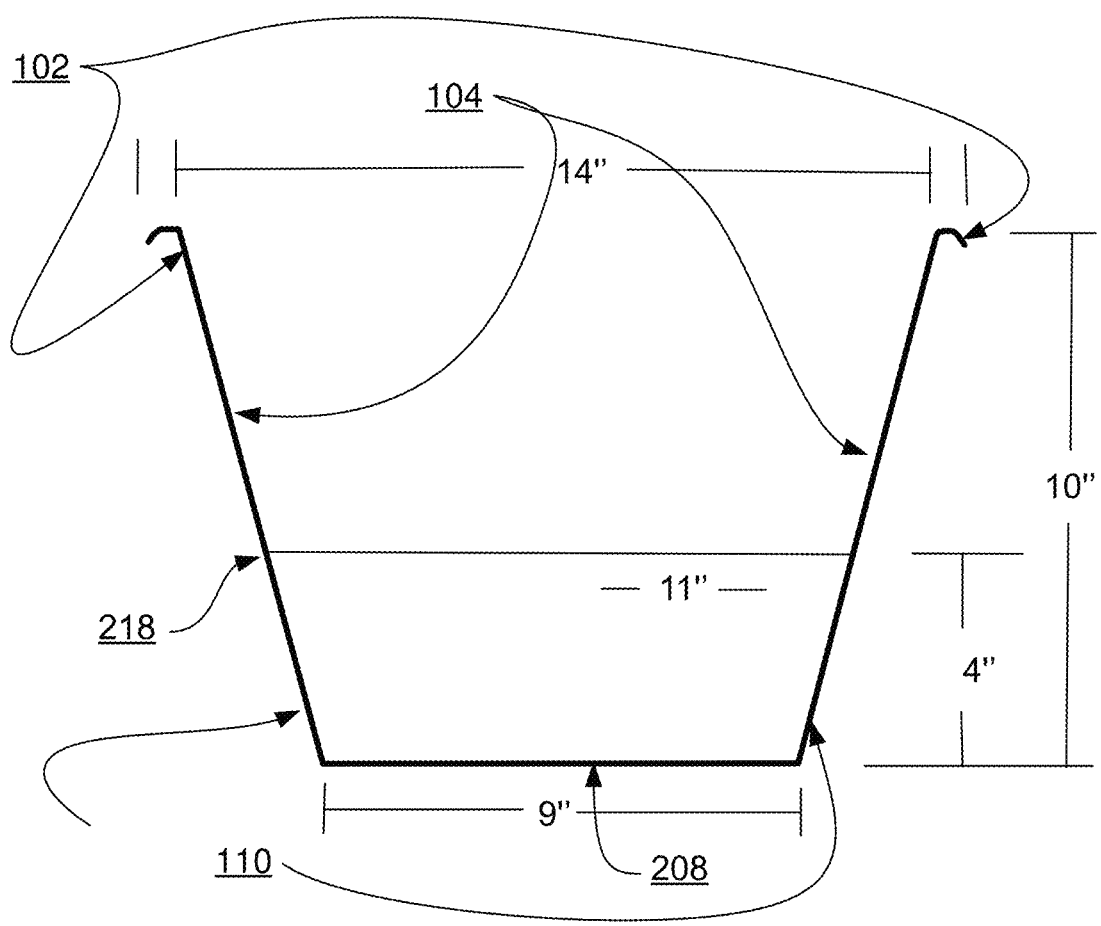
FIG. 3 is a block diagram of a planter apparatus according to an implementation for holding a 2 gallon planter.

FIG. 3 is a block diagram of a planter apparatus 300 for holding a 2 gallon planter. Planter apparatus 300 provides a means of containing and holding a smaller planter (2 gallon volume having dimension of 9" tall and 8.5" top diameter) in a larger planter, and that provides a means of transporting the smaller planter to the second larger planter. The smaller planter and the larger planter are not shown in FIG. 3.

Planter apparatus 300 is a frame that includes at least two hangers 302 and at least two vertical members 304. Each of the hangers 302 is integral (formed from one piece of material) with one of the vertical members 304 (as shown in FIG. 3). In some implementations of the planter apparatus 300, each of the hangers 302 further comprise a hook that is curved away and downward from the first side 306 of the vertical members 304 (as shown in FIG. 3). In some implementations of the planter apparatus 300, each of the hooks circumscribe a mouth of the second planter (not shown in FIG. 3).

A bottom 308 is attached to a second side 310 of the each of the vertical members 304. The bottom 308 further comprises a first ring 312 (not shown in FIG. 3) along a horizontal plane and the bottom 308 further comprises additional structure in the horizontal plane, where in the additional structure further comprises at least one cross-member 314 (not shown in FIG. 3). The at least one cross-member 314 further comprises two equilateral cross-members that intersect each other in a center 316 of the bottom 308 (not shown in FIG. 3).

In some implementations of the planter apparatus 300, the at least two hangers 302 further comprise four hangers 302 (not shown in FIG. 3) and the at least two vertical members 304 further comprises four vertical members 304 (as shown in FIG. 3). The planter apparatus 300 is not limited to four vertical members 304. In some implementations, the planter apparatus 300 has a minimum of 3 vertical members 304. In some implementations, the planter apparatus 300 has a number of pairs of vertical members 304.

In some implementations of the planter apparatus 300, the frame further comprises at least one middle ring 318 that further comprises a second ring (not shown in FIG. 3) along the horizontal plane; and each middle ring 318 is attached to each of the vertical members 304. The second ring can be used to expand the diameter of the mouth of the planter apparatus 300.

In some implementations of the planter apparatus 300, the hangers 302, the vertical members 304, the bottom 308 and the middle ring 318 are metal wire (as shown in FIG. 3) or plastic.

In some implementations of the planter apparatus 300, an interior geometric size and an interior shape of the frame is larger than an exterior geometric size and an exterior shape of the smaller planter.

In some implementations of the planter apparatus 300, the interior geometric size and the interior shape of the frame is approximately the exterior geometric size and the exterior shape of the smaller planter.

In some implementations, (not shown in FIG. 3), distal vertical members 304 and cross-members of the bottom 308 are formed from singular pieces of material, such as metal wire or plastic. Two distal vertical members 304 and one cross-member of the bottom 308 are formed from a singular piece of material, such as metal wire or plastic and another two distal vertical members 304 and one cross-member of the bottom 308 are formed from another singular piece of material (not shown in FIG. 3), such as metal wire or plastic.

The planter apparatus 300 provides a means of containing and holding a smaller planter (2 gallon volume having dimension of 9" tall and 8.5" top diameter) in a larger planter, and a means of transporting the smaller planter to a second larger planter because the smaller planter can be removed by lifting the planter apparatus 300 by the hangers 302, thereby lifting the smaller planter in the planter apparatus 300 from the larger planter, and thereafter the planter apparatus 300 and the smaller planter in the apparatus can be easily transported to another larger planter without having to dig out the plant from the larger planter.

The size and dimensions of apparatus 200 and apparatus 300 are exemplary only, and not limiting.

Figure 4:
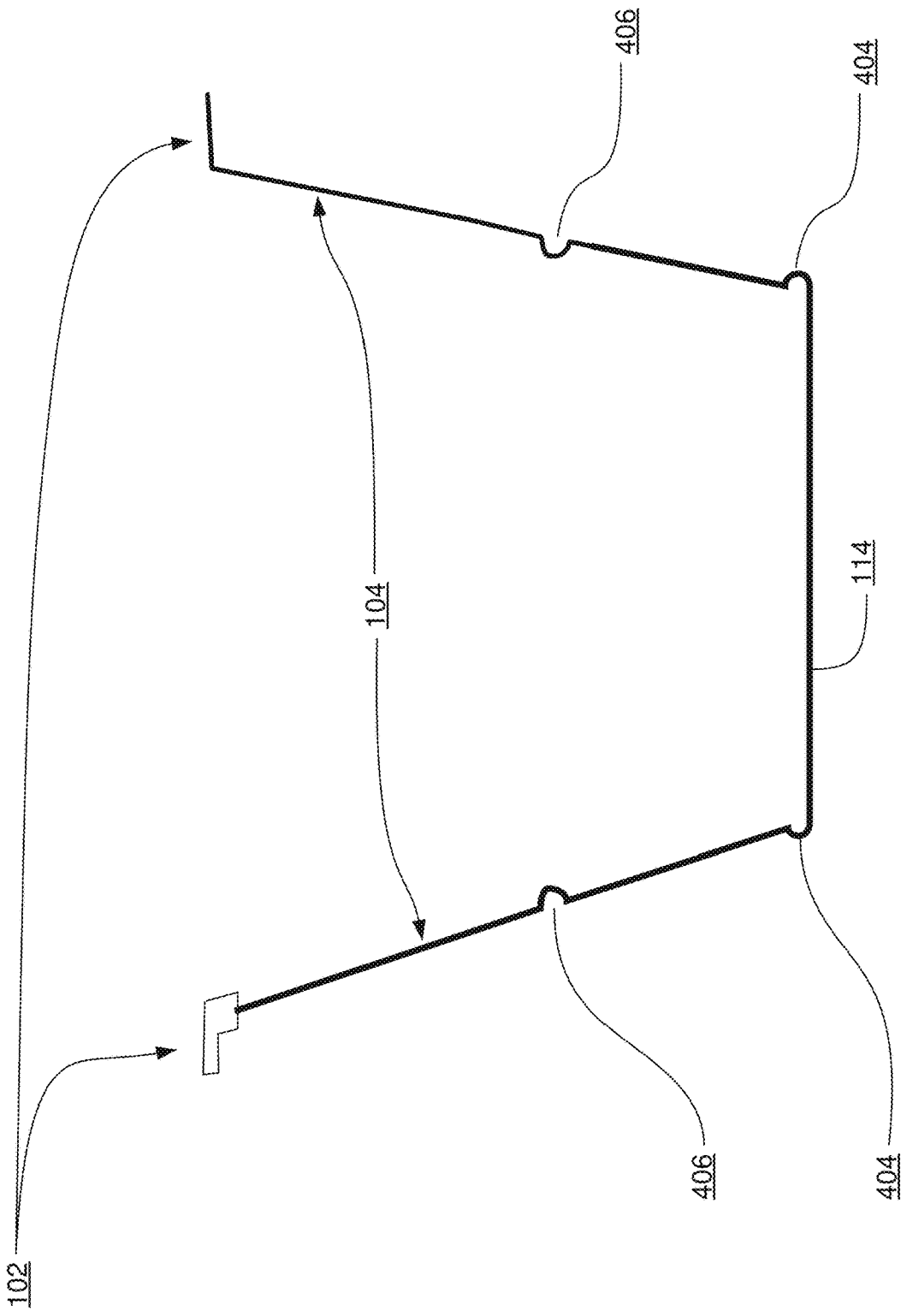
FIG. 4 is a block diagram of for flat packaging/shipping of a planter apparatus, according to an implementation.

FIG. 4 is a block diagram of 400 for flat packaging/shipping of a planter apparatus. When assembled, the planter apparatus provides a means of containing and holding a smaller planter in a larger planter, and a means of transporting the smaller planter to a second larger planter.

400 is formed from metal or plastic.

Figure 5:
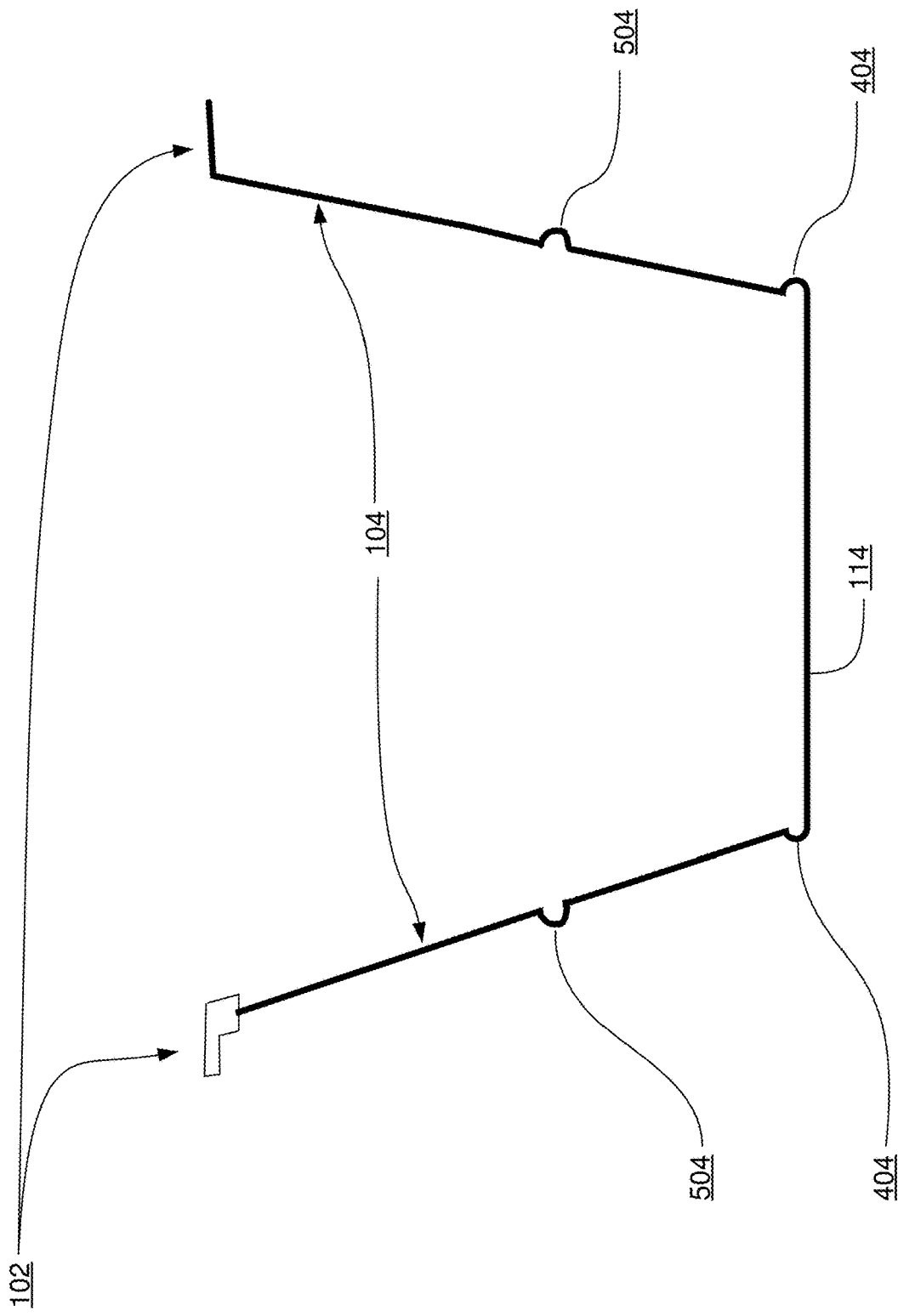
FIG. 5 is a block diagram of for flat packaging/shipping of a planter apparatus, according to an implementation.

FIG. 5 is a block diagram of 500 for flat packaging/shipping of a planter apparatus, according to an implementation. When assembled, the planter apparatus provides a means of containing and holding a smaller planter in a larger planter, and a means of transporting the smaller planter to a second larger planter.

500 is formed from metal or plastic.

Figure 6:
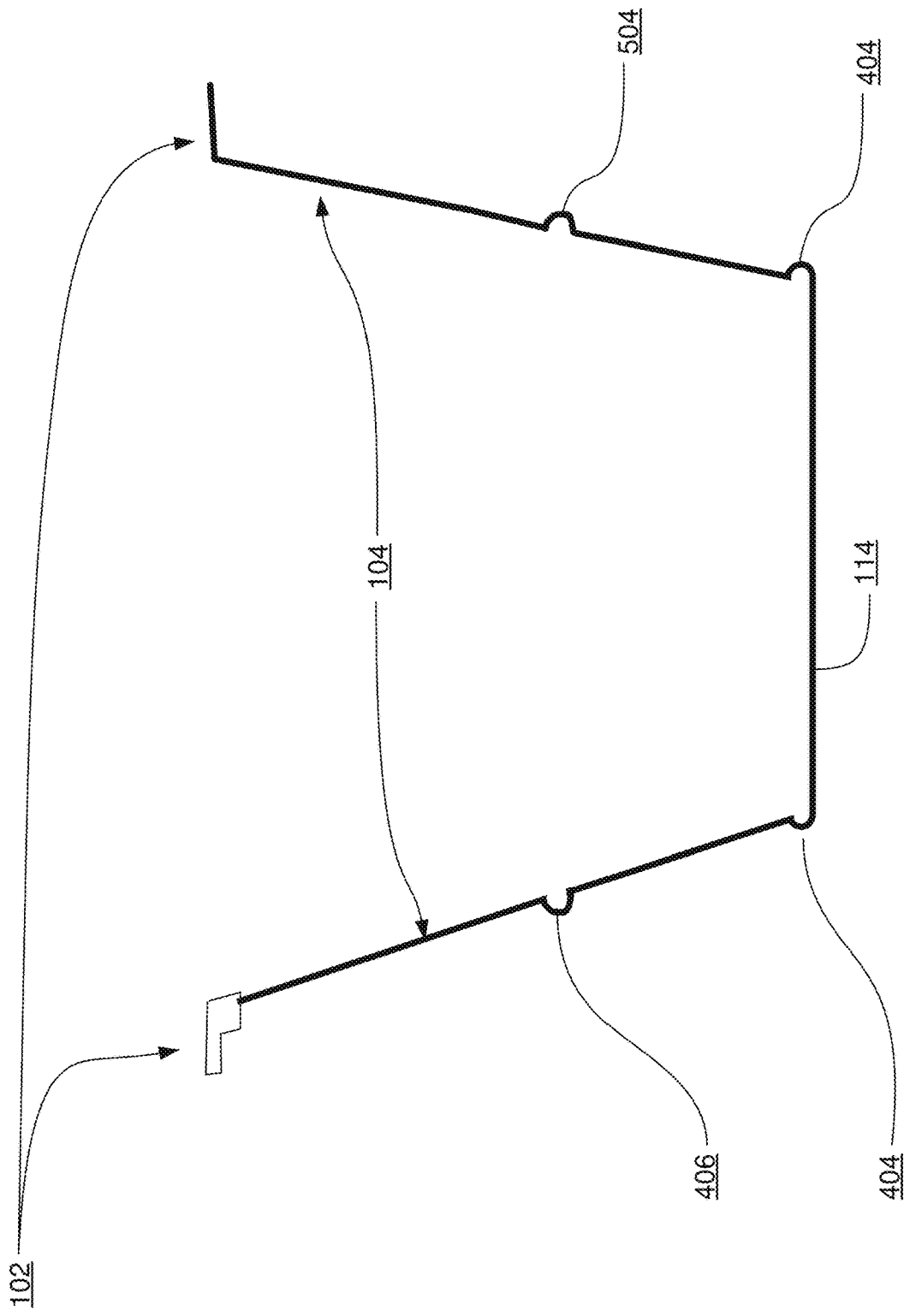
FIG. 6 is a block diagram of packaging/shipping of a planter apparatus, according to an implementation.

FIG. 6 is a block diagram of 600 for flat packaging/shipping of a planter apparatus, according to an implementation. When assembled, the planter apparatus provides a means of containing and holding a smaller planter in a larger planter, and a means of transporting the smaller planter to a second larger planter.

600 is formed from metal or plastic.

Figure 7:
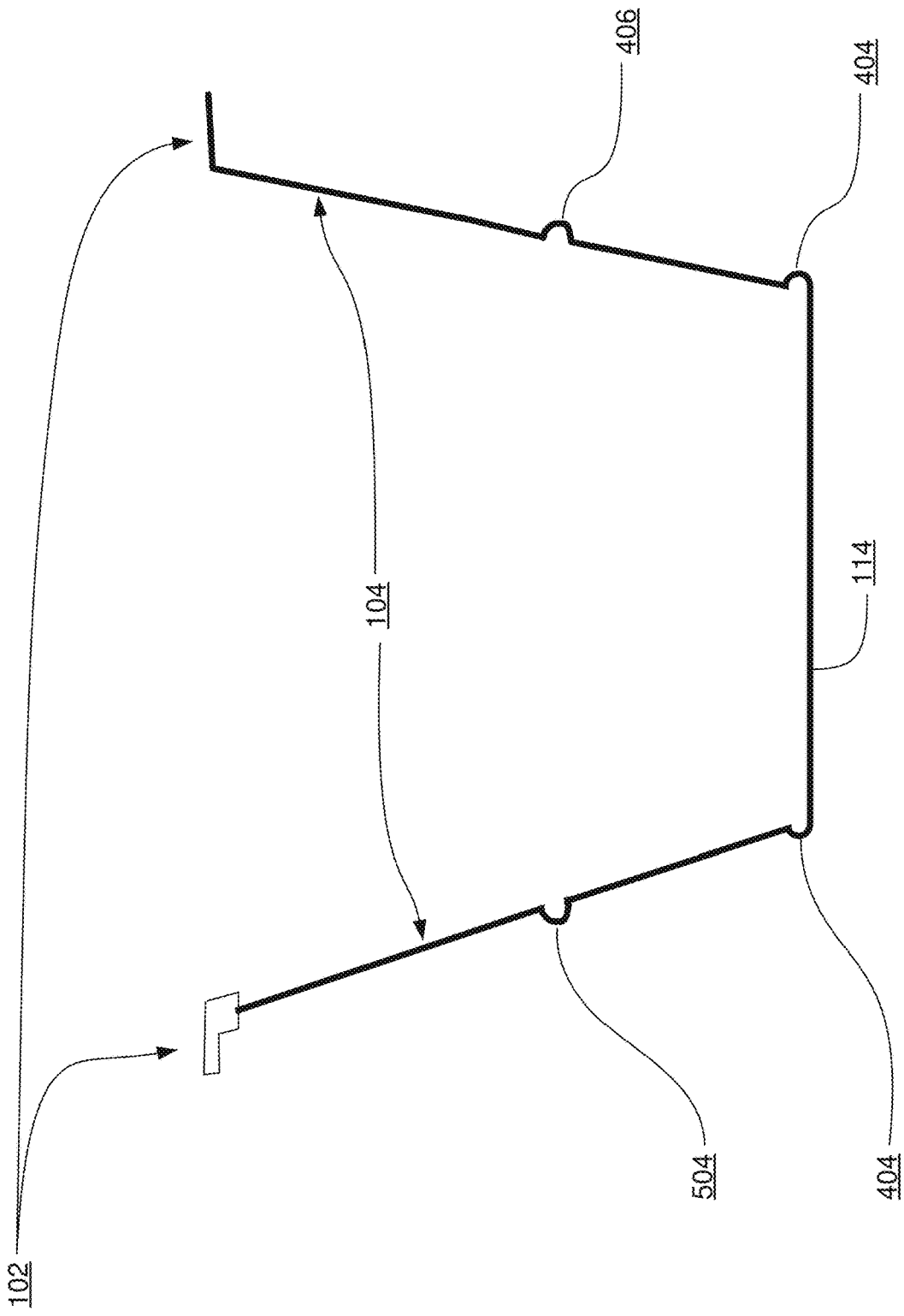
FIG. 7 is a block diagram of flat packaging/shipping of a planter apparatus, according to an implementation.

FIG. 7 is a block diagram of 700 for flat packaging/shipping of a planter apparatus, according to an implementation. When assembled, the planter apparatus provides a means of containing and holding a smaller planter in a larger planter, and a means of transporting the smaller planter to a second larger planter.

700 is formed from metal or plastic.

Figure 8:
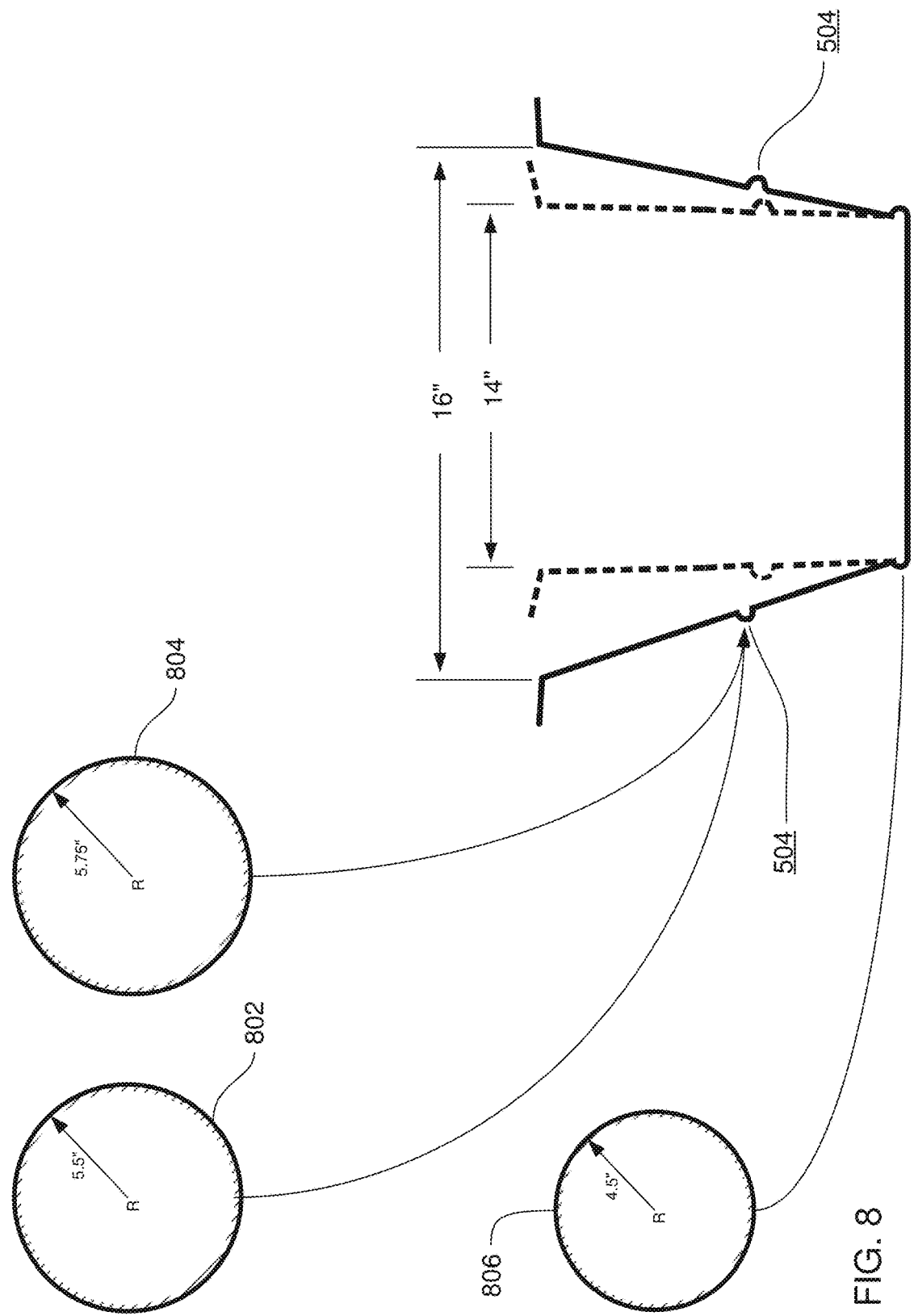
FIG. 8 is a block diagram of flat packaging/shipping of a planter apparatus, according to an implementation.

FIG. 8 is a block diagram of 500 for flat packaging/shipping of a planter apparatus, according to an implementation. When assembled, the planter apparatus provides a means of containing and holding a smaller planter in a larger planter, and a means of transporting the smaller planter to a second larger planter.

FIG. 8 shows two different middle rings 118, having different dimensions, middle ring 802 having a radius of 5.5" and a diameter of 11.0" and middle ring 804 having a radius of 5.75" and a diameter of 11.5". When middle ring 802 is inserted in 500 has a diameter of approximately 14". When middle ring 804 is inserted in 500 has a diameter of approximately 16". FIG. 8 shows one bottom ring 806, having a radius of 4.5". When bottom ring 806 is inserted in 500 has a diameter of approximately 9". Because of the fixed dimensions of the cross-members 114, the bottom ring radius never varies significantly.

Figure 9:
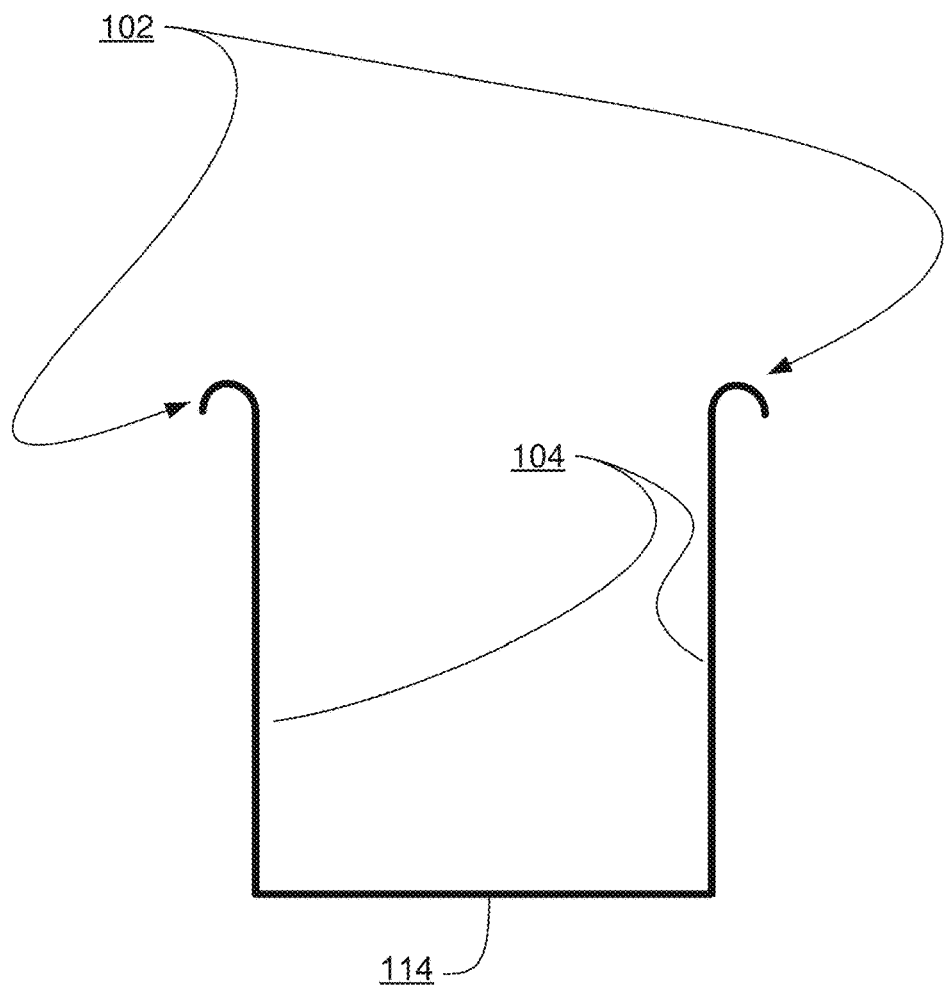
FIG. 9 is a block diagram of, according to an implementation having right angles, according to an implementation.
Figure 10:
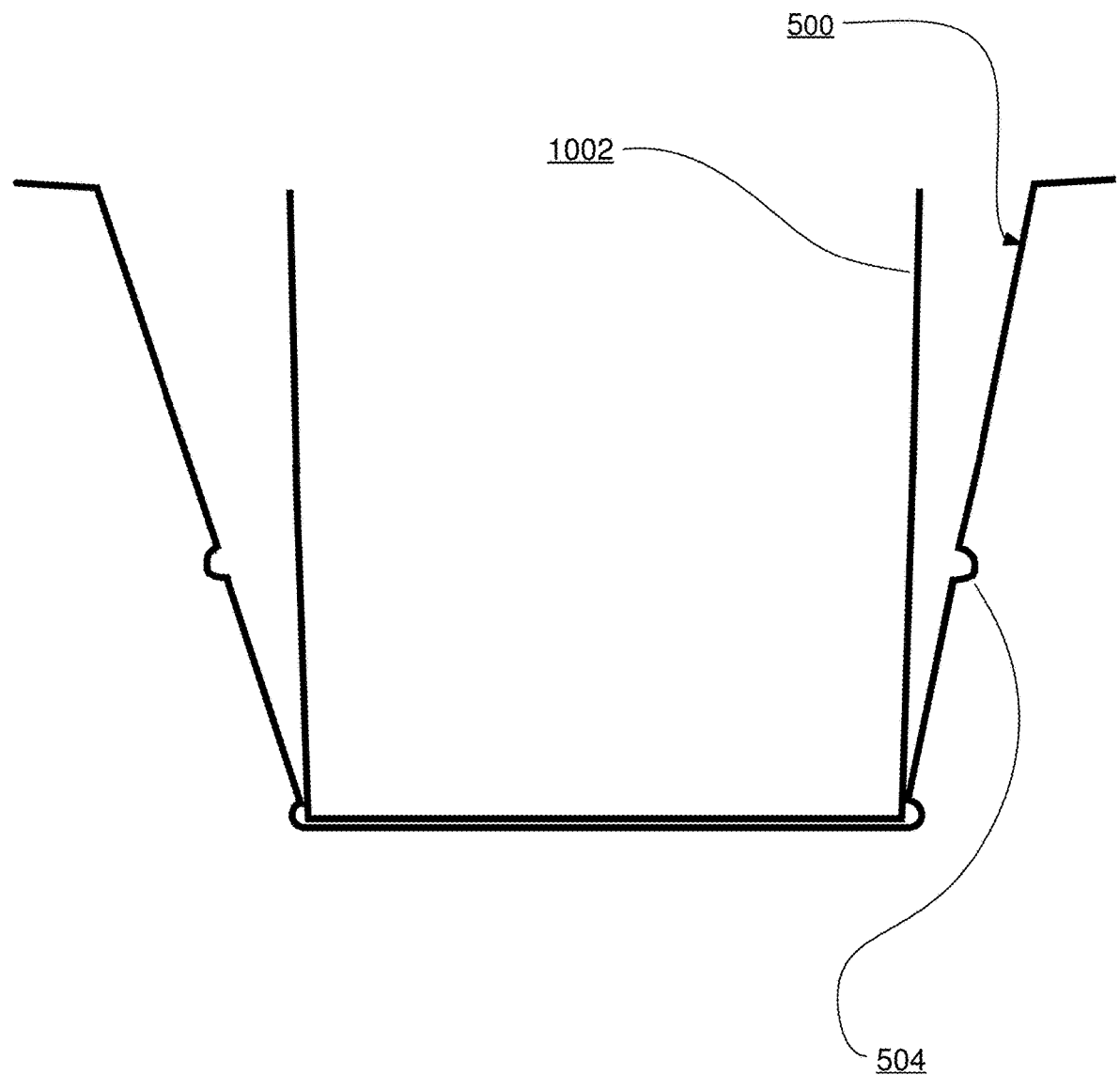
FIG. 10 is a block diagram of a planter apparatus and a planter integrated together, according to an implementation.

FIG. 9 is a block diagram of, according to an implementation having right angles. The provides a means of containing and holding a smaller planter in a larger planter. 900 is formed from or plastic FIG. 10 is a block diagram of an apparatus 1000 of a planter apparatus and a planter integrated together, according to an implementation. Apparatus 1000 includes a conventional planter 1002 that is attached to a planter apparatus, such as weight-bearing member 500 as shown in FIG. 10. As an alternative to the weight-bearing member 500, other apparatus can be used, such as the planter apparatus 100, the planter apparatus 200, the planter apparatus 300, the weight-bearing member 400, the weight-bearing member 700 or the weight-bearing member 800.

The weight-bearing member 500 and the planter 1002 are integrated together to form the singular and unitary planter apparatus 1000. In some implementations, the weight-bearing member 500 and the planter 1002 are formed from a single piece of material, in other implementations, the weight-bearing member 500 and the planter 1002 are permanently attached to each other by gluing, melting or welding portion of the weight-bearing member 500 and the planter 1002 that are in contact with each other, and in other implementations, the weight-bearing member 500 and the planter 1002 are temporarily and removably attached to each other. The conventional planter 1002 can be filled with dirt or other plant growing medium and a plant can be planted or the dirt of medium.

Figure 11:
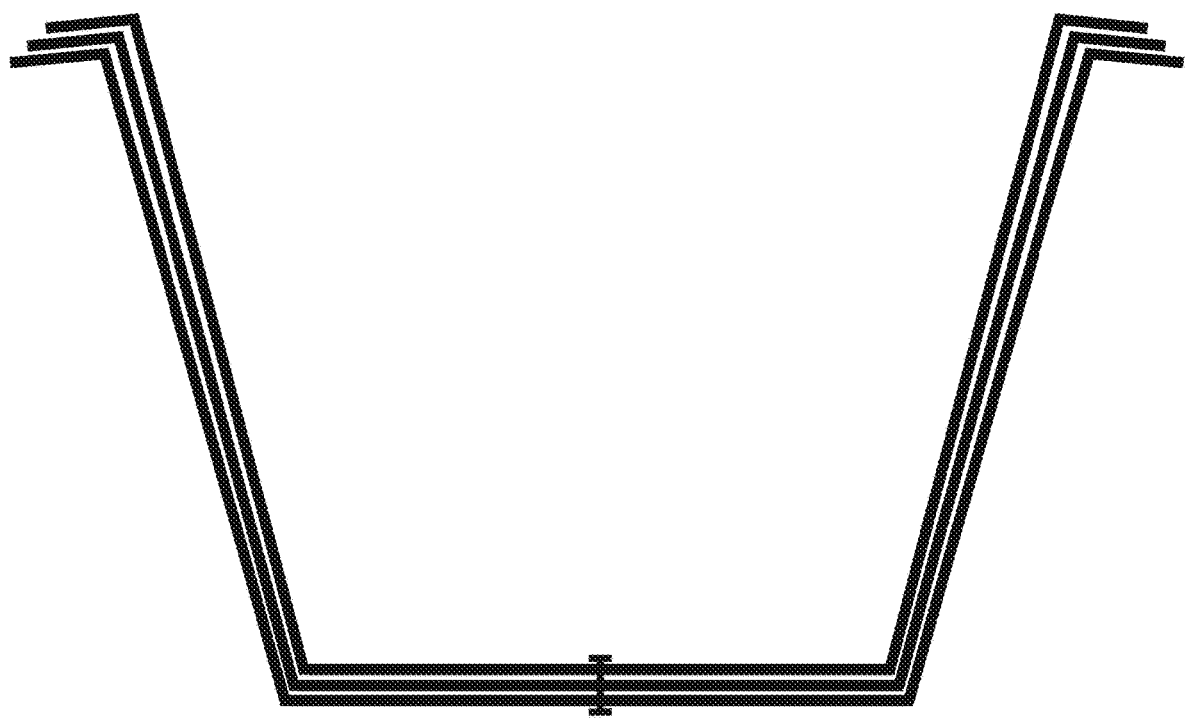
FIG. 11-13 are diagrams of a planter apparatus in various states of deployment, according to an implementation.
Figure 12:
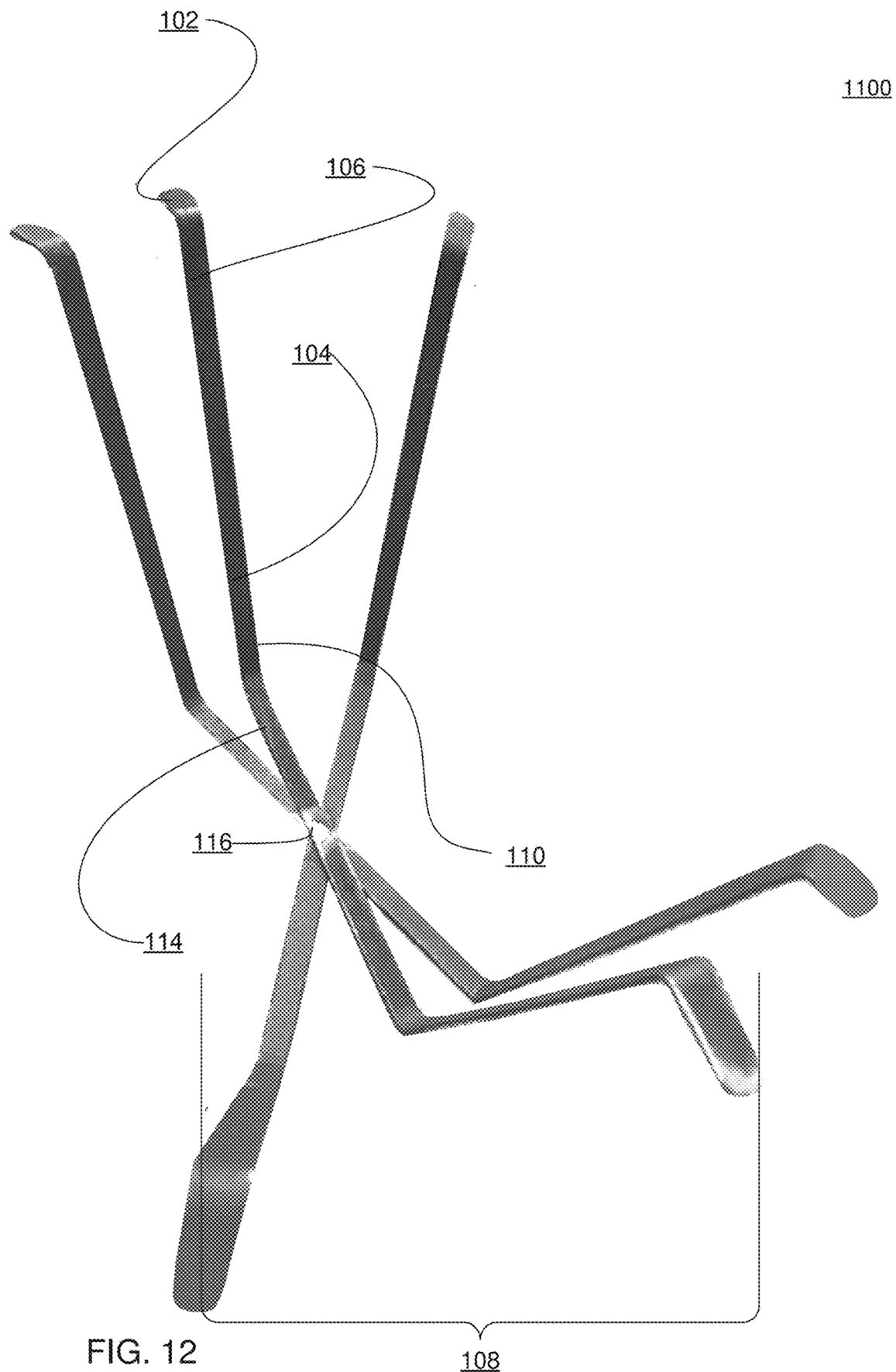
Figure 13:
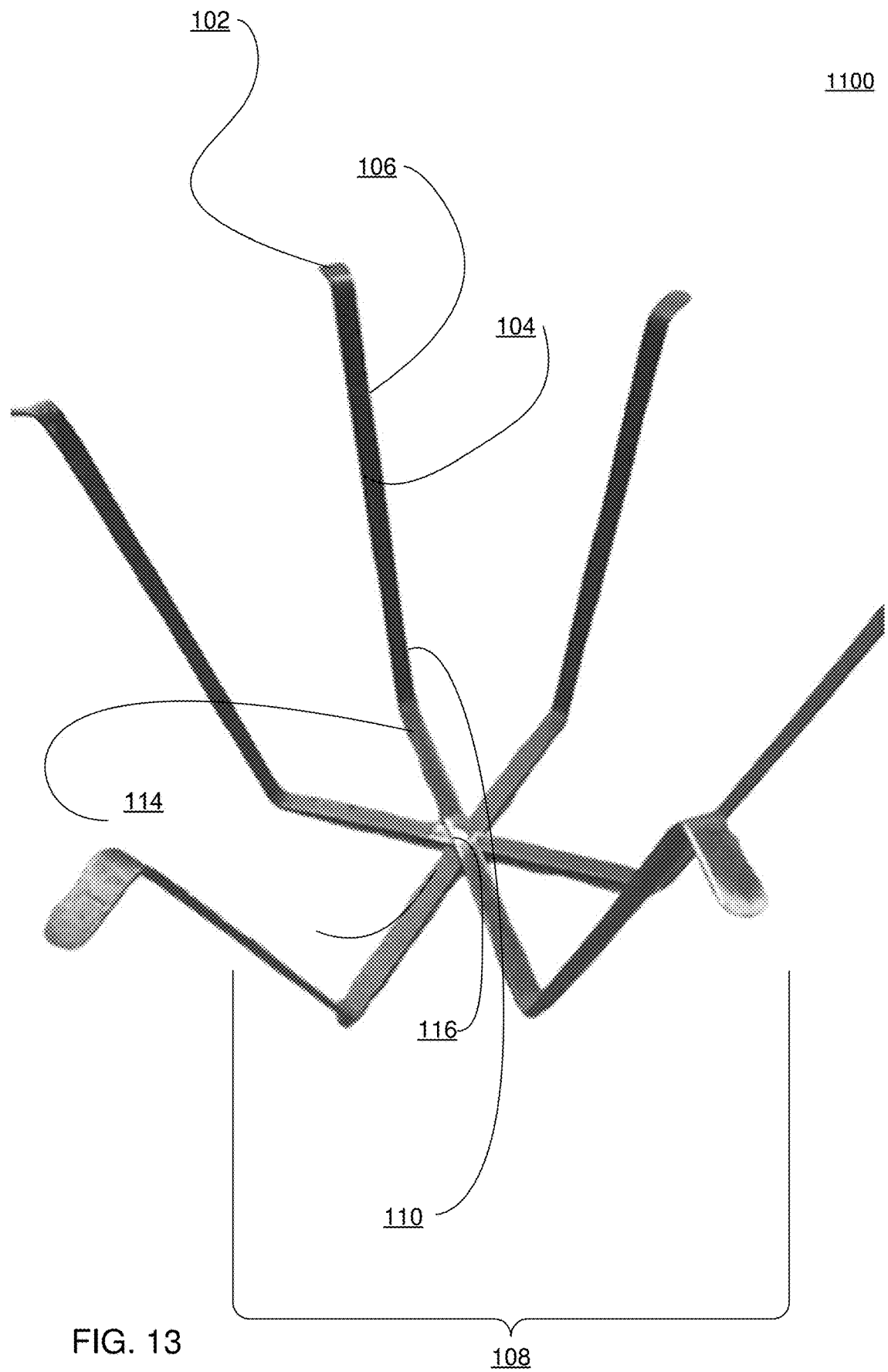

FIG. 11-13 are diagrams of a planter apparatus 1100 in various states of deployment, according to an implementation.

Figure 14:
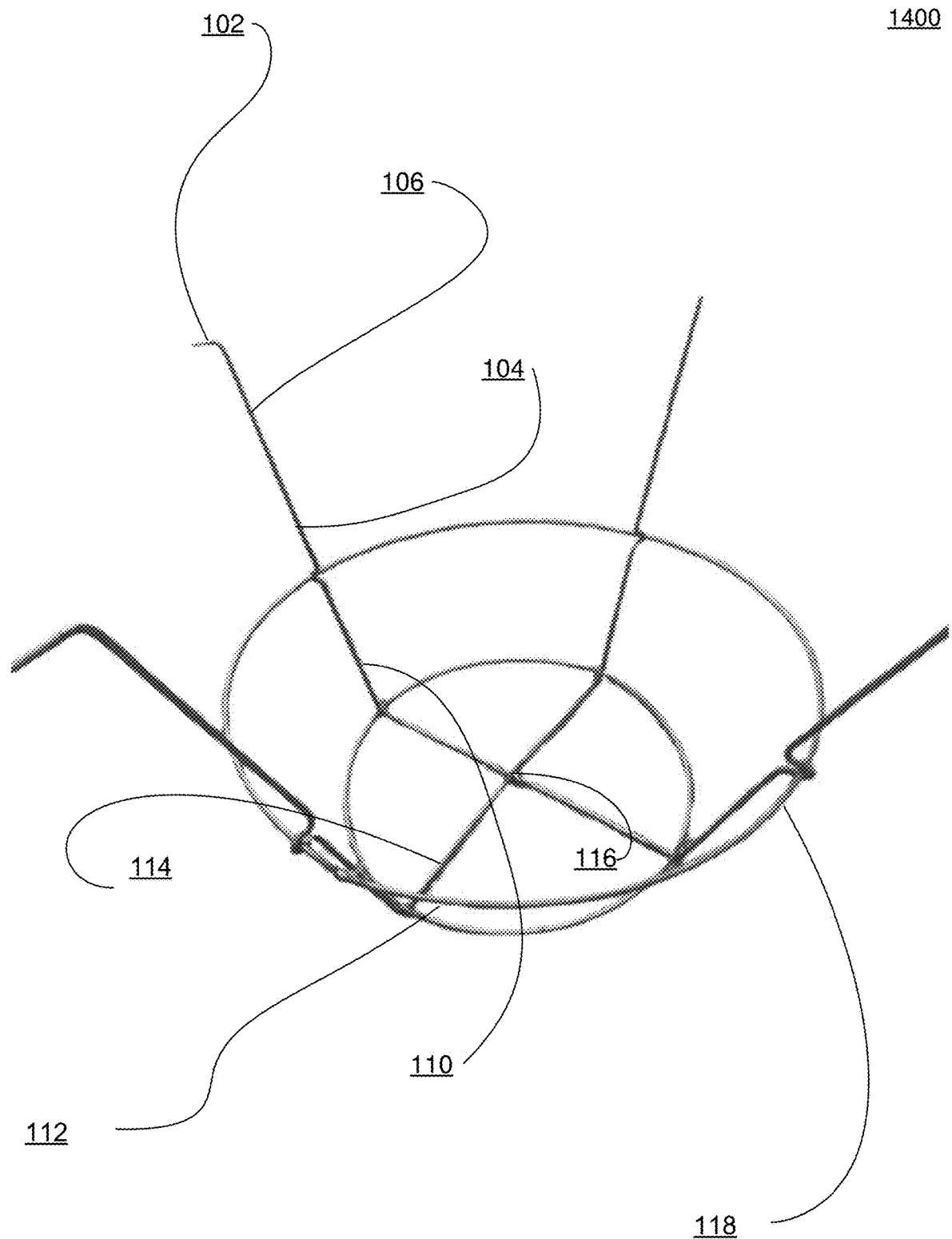
FIG. 14 is a diagram of a two-part planter apparatus in a state of full deployment, according to an implementation.

FIG. 14 is a diagram of a two-part planter apparatus in a state of full deployment, according to an implementation.

Planter apparatus 1100 and 1400 is a frame to hold a first planter in a second planter in which the frame includes at least two hangers 102 and at least two vertical members 104, each of the vertical members 104 attached to at least one of the hangers 102 on a first side 106 of the vertical members 104.

In some implementations of planter apparatus 1100 and 1400, each of the hangers 102 further comprise a hook that is curved away and downward from the first side 106 of the vertical members 104 (as shown in FIG. 11-14).

In some implementations of planter apparatus 1100 and 1400, each of the hooks circumscribe a mouth of the second planter (not shown in FIG. 11-14).

In some implementations of the planter apparatus 1400, a bottom further comprises a first ring 112 (bottom ring) along a horizontal plane and the bottom 108. The first ring 112 shown in FIG. 14 is an outer compression ring. Some implementations of the planter apparatus 1400 further comprise additional structure in the horizontal plane, wherein the additional structure further comprises at least one cross-member 114 (as shown in FIGS. 11 and 14).

In some implementations of the planter apparatus 1100 and 1400, the at least one cross-member 114 further comprises two equilateral cross-members that intersect each other in a center 116 of the bottom (as shown in FIG. 14).

In some implementations of the planter apparatus 1100 and 1400, the at least two hangers 102 further comprise four hangers 102 (as shown in FIG. 14) and the at least two vertical members 104 further comprises four vertical members 104 (as shown in FIG. 14).

In some implementations of the planter apparatus 1100, each of the hangers 102 is integral (formed from one piece of material) with one of the vertical members 104 (as shown in FIG. 11-13). For round planters, the planter apparatus 1100 and 1400 includes at least three vertical members 104 because having only two vertical members 104 is more susceptible to swaying from side-to-side from sideways bumps or jolts.

In some implementations of the planter apparatus 1400, the frame further comprises at least one middle ring 118 that further comprises second ring along the horizontal plane and each middle ring is attached to each of the vertical members 104, which can be used to expand the radius and diameter of the hook pattern, or can be used to compress to fit smaller openings.

In some implementations of the planter apparatus 1100 and 1400, the hangers 102, the vertical members 104, the bottom 108 and the middle ring 118 are metal wire (as shown in FIG. 14) or plastic or any functionally equivalent weight-bearing material. In other implementations of the planter apparatus 1100 and 1400, the hangers 102, the vertical members 104, the bottom 108 and the middle ring 118 are plastic.

In some implementations of the planter apparatus 1100 and 1400, an interior geometric size and an interior shape of the frame is larger than an exterior geometric size and an exterior shape of the first planter.

In some implementations of the planter apparatus 1100 and 1400, the interior geometric size and the interior shape of the frame is approximately the exterior geometric size and the exterior shape of the first planter.

In some implementations, such as shown in FIG. 11, distal vertical members 104 and cross-members of the bottom 108 are formed from singular pieces of material, such as metal wire (as shown in FIG. 11). In the example of FIG. 11-13, two distal vertical members 104 and one cross-member of the bottom 108 are formed from a singular piece of material, such as metal wire, a second two distal vertical members 104 and one cross-member of the bottom are formed from another singular piece of material, such as metal wire and third two distal vertical members 104 and one cross-member of the bottom are formed from another singular piece of material, such as metal wire (as shown in FIG. 11-13). Planter apparatus 1100 and 1400 provide means of containing and holding a smaller planter in a larger planter, and provide means of transporting the smaller planter to a second larger planter because the smaller planter can be removed by lifting the planter apparatus 1100 and 1400 by the hangers 102, thereby lifting the smaller planter in the planter apparatus 1100 and 1400 from the larger planter, and thereafter the planter apparatus 1100 and 1400 and the smaller planter in the apparatus can be easily transported to another larger planter without having to dig out the plant from the larger planter.

Method Implementations

In the previous section, apparatus of the operation of an implementation was described. In this section, the particular methods performed by a machine of such an implementation are described by reference to a series of flowcharts.

Figure 15:
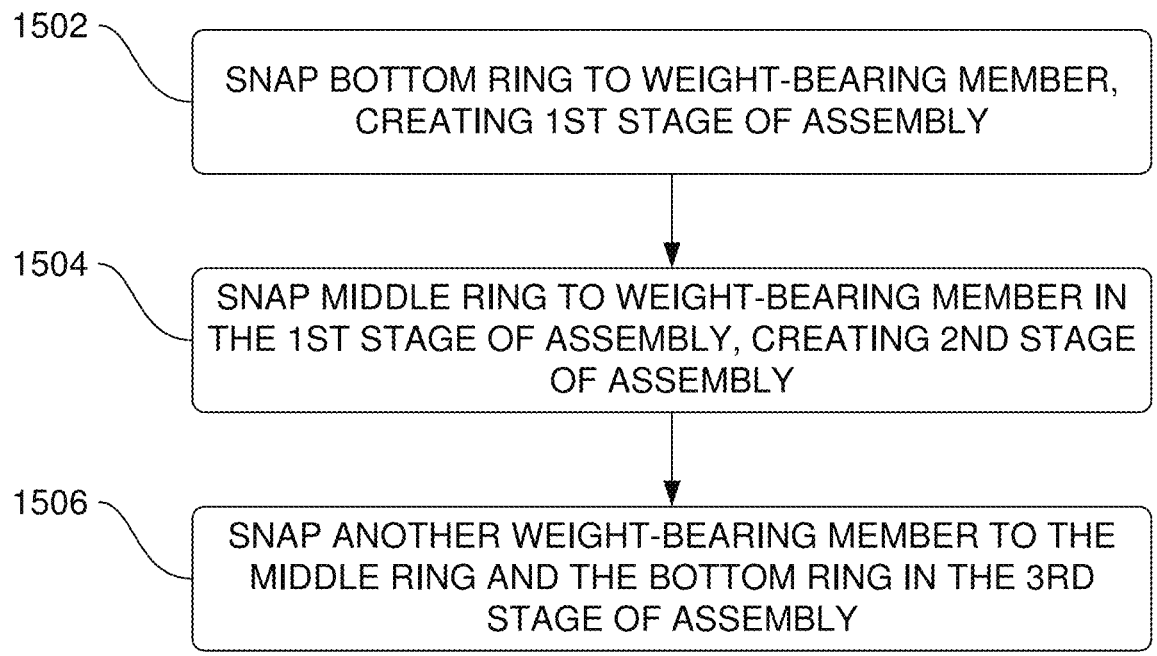
FIG. 15 is a flowchart of a method to assemble a planter apparatus, according to an implementation.

FIG. 15 is a flowchart of a method 1500 to assemble a planter apparatus, according to an implementation.

Method 1500 includes snapping a bottom ring 152 to a weight-bearing member 400 at block 1502, thus creating a 1st stage of assembly; snapping a middle ring 118 to the weight-bearing member in the 1st stage of assembly at block 1504, thus creating a 2nd stage of assembly; and snapping another weight-bearing member 400 to the middle ring 118 and the bottom ring 112, at block 1506 thus creating a 3rd stage of assembly. The 3rd stage of assembly is planter apparatus 100, planter apparatus 200, planter apparatus 300, or planter apparatus 1400. In some embodiments, the bottom ring 152 and/or the middle ring 118 are snapped into the weight-bearing member 400 (FIG. 4), the weight-bearing member 500 (FIG. 5), the weight-bearing member 600 (FIG. 6), or the weight-bearing member 700 (FIG. 7). In some embodiments, for example, as shown in FIGS. 5-7, the U-shaped weight-bearing member comprises the middle ring receiver 504 on each of the vertical members and the bottom ring protrusions 404. In some embodiments, as shown in the figures, the respective receivers 504 are semi-circular protrusions that extend outward from the otherwise linear vertical members. In some embodiments, as shown in the figures, the respective protrusions 404 are semi-circular protrusions that extend outward from at the intersection of the vertical members and the cross-member of the U-shaped weight-bearing member. In various embodiments, the middle ring receiver 504 and the bottom ring protrusions 404 are configured to receive the middle ring and bottom ring, respectively. In some embodiments, the middle ring receiver 504 and the bottom ring protrusions 404 are configured to securably receive the middle ring and bottom ring, respectively, and retain the rings in position during use.

Hardware and Operating Environment

Figure 16:
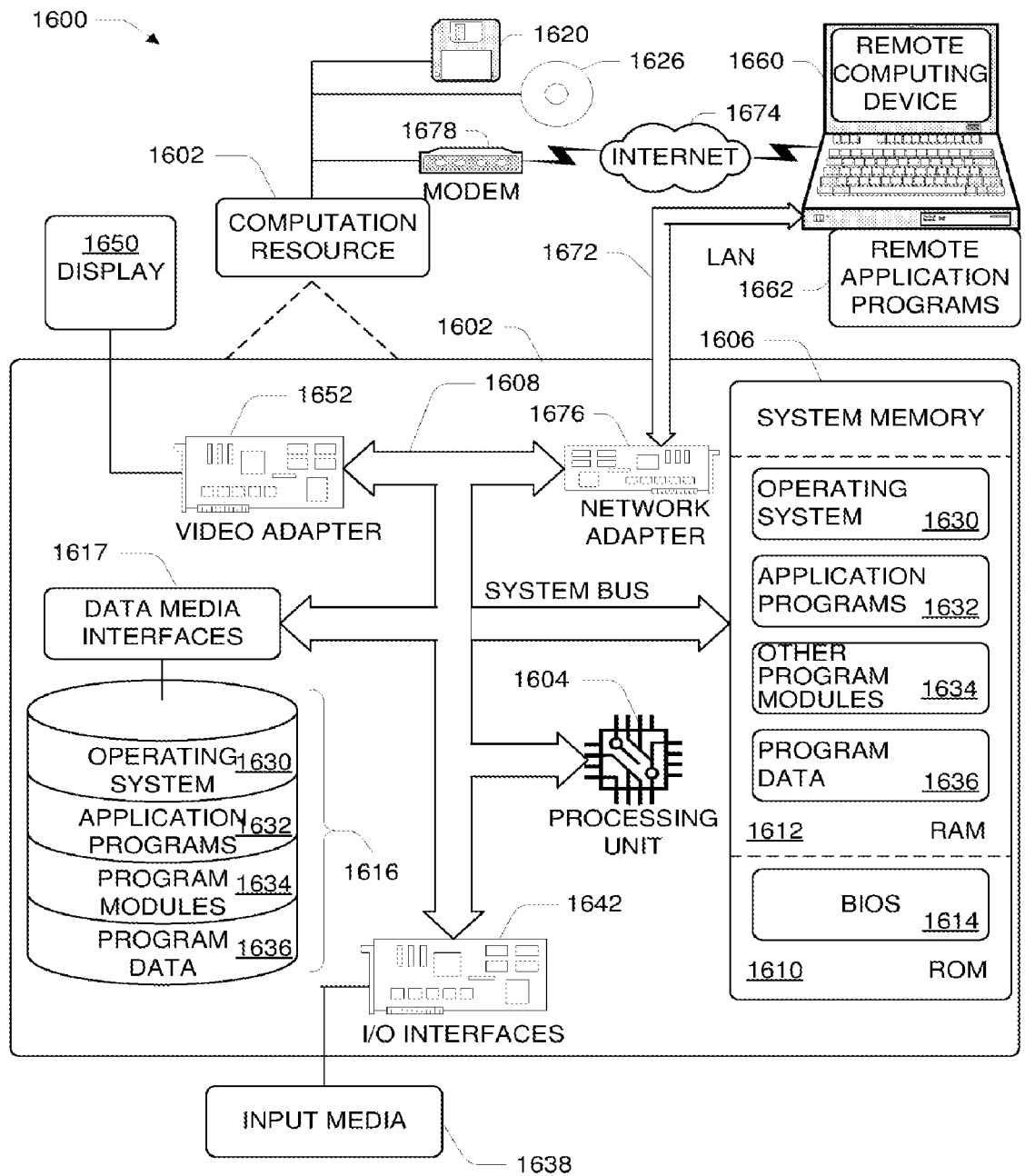
FIG. 16 is a block diagram of a hardware and operating environment, according to an implementation.

FIG. 16 is a block diagram of a hardware and operating environment 1600 in which different implementations can be practiced. The description of FIG. 16 provides an overview of computer hardware and a suitable computing environment in conjunction with which some implementations can be implemented to perform method 1500 in FIG. 15 by an external robotic device to assemble the planter apparatus either by welding the components together or snapping the components together. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

Computer 1602 includes a processor 1604, commercially available from Intel, Motorola, Cyrix and others. Computer 1602 also includes random-access memory (RAM) 1606, read-only memory (ROM) 1608, and one or more mass storage devices 1610, and a system bus 1612, that operatively couples various system components to the processor 1604. The memory 1606, 1608, and mass storage devices, 1610, are types of computer-accessible media. Mass storage devices 1610 are more specifically types of nonvolatile computer-accessible media and can include one or more hard disk drives, floppy disk drives, optical disk drives, and tape cartridge drives. The processor 1604 executes computer programs stored on the computer-accessible media.

Computer 1602 can be communicatively connected to the Internet 1614 via a communication device 1616. Internet 1614 connectivity is well known within the art. In one implementation, a communication device 1616 is a modem that responds to communication drivers to connect to the Internet via what is known in the art as a "dial-up connection." In another implementation, a communication device 1616 is an Ethernet® or similar hardware network card connected to a local-area network (LAN) that itself is connected to the Internet via what is known in the art as a "direct connection" (e.g., T1 line, etc.).

A user enters commands and information into the computer 1602 through input devices such as a keyboard 1618 or a pointing device 1620. The keyboard 1618 permits entry of textual information into computer 1602, as known within the art, and implementations are not limited to any particular type of keyboard. Pointing device 1620 permits the control of the screen pointer provided by a graphical user interface (GUI) of operating systems such as versions of Microsoft Windows®. Implementations are not limited to any particular pointing device 1620. Such pointing devices include mice, touch pads, trackballs, remote controls and point sticks. Other input devices (not shown) can include a microphone, joystick, game pad, satellite dish, scanner, or the like.

In some implementations, computer 1602 is operatively coupled to a display device 1622. Display device 1622 is connected to the system bus 1612. Display device 1622 permits the display of information, including computer, video and other information, for viewing by a user of the computer. Implementations are not limited to any particular display device 1622. Such display devices include cathode ray tube (CRT) displays (monitors), as well as flat panel displays such as liquid crystal displays (LCD's). In addition to a monitor, computers typically include other peripheral input/output devices such as printers (not shown). Speakers 1624 and 1626 provide audio output of signals. Speakers 1624 and 1626 are also connected to the system bus 1612.

Computer 1602 also includes an operating system (not shown) that is stored on the computer-accessible media RAM 1606, ROM 1608, and mass storage device 1610, and is and executed by the processor 1604. Examples of operating systems include Microsoft Windows®, Apple MacOS®, Linux®, UNIX®. Examples are not limited to any particular operating system, however, and the construction and use of such operating systems are well known within the art.

Implementations of computer 1602 are not limited to any type of computer 1602. In varying implementations, computer 1602 comprises a PC-compatible computer, a MacOS®-compatible computer, a Linux®-compatible computer, or a UNIX®-compatible computer. The construction and operation of such computers are well known within the art.

Computer 1602 can be operated using at least one operating system to provide a graphical user interface (GUI) including a user-controllable pointer. Computer 1602 can have at least one web browser application program executing within at least one operating system, to permit users of computer 1602 to access intranet or Internet world-wide-web pages as addressed by Universal Resource Locator (URL) addresses. Examples of browser application programs include Netscape Navigator® and Microsoft Internet Explorer®.

The computer 1602 can operate in a networked environment using logical connections to one or more remote computers, such as remote computer 1628. These logical connections are achieved by a communication device coupled to, or a part of, the computer 1602. Implementations are not limited to a particular type of communications device. The remote computer 1628 can be another computer, a server, a router, a network PC, a client, a peer device or other common network node. The logical connections depicted in FIG. 16 include a local-area network (LAN) 1630 and a wide-area network (WAN) 1632. Such networking environments are commonplace in offices, enterprise-wide computer networks, intranets and the Internet.

When used in a LAN-networking environment, the computer 1602 and remote computer 1628 are connected to the local network 1630 through network interfaces or adapters 1634, which is one type of communications device 1616. Remote computer 1628 also includes a network device 1636. When used in a conventional WAN-networking environment, the computer 1602 and remote computer 1628 communicate with a WAN 1632 through modems (not shown). The modem, which can be internal or external, is connected to the system bus 1612. In a networked environment, program modules depicted relative to the computer 1602, or portions thereof, can be stored in the remote computer 1628.

Computer 1602 also includes power supply 1638. Each power supply can be a battery.

Robotic assembly can be controlled through I/O interfaces 1642 or the Internet 1674.

CONCLUSION

A planter apparatus is described. Although specific implementations are illustrated and described herein, it will be appreciated by those of ordinary skill in the art that any arrangement which is calculated to achieve the same purpose may be substituted for the specific implementations shown. A technical effect of the planter apparatus is to temporarily or removeable hang or position a planter in a larger planter. This application is intended to cover any adaptations or variations. For example, although described in gardening terms, one of ordinary skill in the art will appreciate that implementations can be made in industrial or any other implementations that provide the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future planter devices, different materials, and new structures.

Some implementations of a frame to hold a first planter in a second planter the frame include at least two hangers and at least two vertical members, each of the vertical members attached to at least one of the hangers on a first side of the vertical members, and a bottom attached to a second side of the each of the vertical members, wherein each of the hangers further comprise a hook that is curved away and downward from the first side of the vertical members, wherein each of the hooks circumscribe a mouth of the second planter; wherein the bottom further comprises a first ring along a horizontal plane and the bottom further comprises additional structure in the horizontal plane, where in the additional structure further comprises at least one cross-member, wherein the at least one cross-member further comprises two equilateral cross-members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring that further comprises second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of the first planter, wherein the interior geometric size and the interior shape of the frame is approximately the exterior geometric size and the exterior shape of the first planter.

Some implementations of a frame includes at least two hangers and at least two vertical members, each of the vertical members attached to at least one of the hangers on a first side of the vertical members; and a bottom attached to a second side of the each of the vertical members, wherein the hangers further comprise hooks that are curved away and downward from the first side of the vertical members, wherein the hooks are semicircular, wherein the bottom further comprises a first ring along a horizontal plane and the bottom further comprises additional structure in the horizontal plane, wherein the additional structure further comprises at least one cross-member, wherein the at least one cross-member further comprises two equilateral cross members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring further comprises a second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of a first planter, wherein the interior geometric size and the interior shape of the frame is approximately the exterior geometric size and the exterior shape of the first planter.

Some implementations of a frame include at least two vertical members, a bottom attached to a first side of the each of the vertical members; each of the vertical members forming a hanger on a distal side of the vertical members, thus forming at least two hangers; and wherein the hangers further comprise hooks that are curved away and downward from the first side of the vertical members, wherein the hooks are semicircular, wherein the bottom further comprises a first ring along a horizontal plane and the bottom further comprises additional structure in the horizontal plane, wherein the additional structure further comprises at least one cross-member, wherein the at least one cross-member further comprises two equilateral cross members that intersect each other in a center of the bottom, wherein the at least two hangers further comprises four hangers and the at least two vertical members further comprises four vertical members, wherein each of the hangers is integral with one of the vertical members, wherein the frame further comprises at least one middle ring further comprises a second ring along the horizontal plane and each middle ring is attached to each of the vertical members, wherein the hangers, wherein the vertical members, the bottom and the middle ring are metal wire or plastic, wherein an interior geometric size and an interior shape of the frame is larger than an exterior geometric size and an exterior shape of a first planter, wherein the interior geometric size and the interior shape of the frame is approximately the exterior geometric size and the exterior shape of the first planter.

The terminology used in this application is meant to include all planters and decorative environments and alternate technologies which provide the same functionality as described herein.

The invention claimed is:

1. A frame to hold a first planter in a second planter, the frame comprising:
   a pair of U-shaped members coupled to one another, each respective U-shaped member comprising:
   two hangers at opposing ends of the U-shaped member;
   two vertical members, each respective vertical member being attached to one of the two hangers at a first end of the vertical member; and a cross-member attached to a second end of the each of the vertical members;

wherein each of the respective hangers comprises a hook configured to be removably coupled to a mouth of the second planter;

wherein the pair of U-shaped members are coupled to one another at a center position of the respective cross-members, forming an inverted and truncated conical volume configured to receive the first planter; and a removable first ring configured to extend circumferentially around the frame and contact the vertical members of each respective U-shaped member;

wherein the removable first ring is sized and configured to expand a diameter of the inverted and truncated conical volume defined by the pair of U-shaped members.

2. The frame of claim 1, wherein the respective cross-members intersect each other in a center position of the U-shaped members.

3. The frame of claim 1, wherein the removable first ring contacts the vertical members of the U-shaped members at a position between the first end and the second end of each respective vertical member.

4. The frame of claim 3, further comprising a removable second ring configured to extend circumferentially around the frame and contact the vertical members of each respective U-shaped member; wherein the removable second ring is configured to contact each of the vertical members at a position adjacent to the cross-members.

5. The frame of claim 4, wherein each of the U-shaped members comprises a second protrusion where the respective vertical members contact the corresponding cross-member, the protrusion configured to receive the removable second ring.

6. The frame of claim 3, wherein each of the respective vertical members of the U-shaped members comprises a first protrusion between the first and second ends of each respective vertical member, the first protrusion configured to receive the removable first ring.

7. The frame of claim 1, wherein each of the hangers is integrated with one of the vertical members.

8. The frame of claim 1, wherein each of the hangers, vertical members, cross-members, and first ring are comprised of metal wire.

9. The frame of claim 1, wherein an interior geometric size and an interior shape of the frame is larger than an exterior geometric size and an exterior shape of the first planter.

10. The frame of claim 9, wherein the interior geometric size and the interior shape of the frame is approximately the exterior geometric size and the exterior shape of the first planter.

11. A frame to hold a first planter in a second planter, the frame comprising:

a pair of U-shaped members coupled to one another, wherein each respective U-shaped member comprises a first and second vertical member projecting upward from opposing ends of a cross-member to a first and second hanger, respectively, wherein each of the first and second hangers comprises a hook-shaped head extending away from the cross-member, and each respective hanger is configured to be removably coupled to a rim of the second planter;

wherein the pair of U-shaped members are coupled to one another at a center position of the respective cross-members, forming an X-shaped bottom and a truncated conical volume configured to receive the first planter; and a removable first ring configured to extend circumferentially around the frame and contact the first and second vertical member of each respective U-shaped member.

12. The frame of claim 11, wherein each of the U-shaped members and the removable first ring are comprised of metal wire.

13. The frame of claim 11, wherein the removable first ring contacts the vertical members of the U-shaped members at a position between the cross-member and the first and second hangers of each respective vertical member.

14. The frame of claim 11, further comprising a removable second ring.

15. The frame of claim 14, wherein the removable second ring frame is configured to extend circumferentially around the frame and contact the first and second vertical member of each respective U-shaped member at a position adjacent to the cross-member.

16. The frame of claim 15, wherein each of the U-shaped members comprises a second protrusion where the respective vertical members project upward from the corresponding cross-member, the second protrusion configured to receive the removable second ring.

17. The frame of claim 11, wherein the first and second vertical members each comprise a protrusion between the cross-member and the first and second hangers of each respective vertical member, the protrusion configured to receive the first ring.

* * * * *